Nov. 22, 1960

J. T. CARLETON 2,961,597

COMPENSATING CIRCUIT

Filed March 7, 1957

WITNESSES:
C. L. McHale
Wm. B. Sellers.

INVENTOR
James T. Carleton

BY
F. E. Browder
ATTORNEY

United States Patent Office 2,961,597
Patented Nov. 22, 1960

2,961,597

COMPENSATING CIRCUIT

James T. Carleton, Severna Park, Md., assignor to Westinghouse Electric Corporation, East Pittsburgh, Pa., a corporation of Pennsylvania Filed Mar. 7, 1957, Ser. No. 644,557

16 Claims. (Cl. 323—78)

This invention relates to electric circuits and more particularly to improvements in circuits for line drop compensators.

Line drop compensating circuits are used with voltage responsive devices such as induction regulators, step-type voltage regulators, voltage sensitive relays and other types of voltage regulators. The line drop compensating circuit provides a compensating voltage proportional to the voltage drop in an alternating current circuit between the point where the voltage responsive device is connected and some other point on the alternating current circuit such as a load center. The line drop compensating circuit includes a resistive component and a reactive component proportional to the resistance and reactance respectively of a particular section of the alternating current circuit. There are several methods known to the art of obtaining the reactive component of the line drop compensating circuit. One method employed is to circulate a current proportional to the line current of the alternating current circuit through a reactor having a number of taps. The adjustment of reactive compensation is obtained by selecting the proper reactor tap. One disadvantage of this method is that the reactive compensation can not be continuously varied. A second method used to obtain reactive voltage compensation is to bridge a reactor with a variable resistance whose setting adjusts the amount of reactive voltage compensation. Both of the methods described above have the disadvantage that each method introduces a phase angle error in the reactive compensating voltage since the reactive compensating voltage produced is usually somewhat less than 90° out of phase with the line current of the alternating current circuit.

It is an object of this invention to provide a new and improved compensating circuit.

Another object of this invention is to provide a new and improved line drop compensating circuit.

A more specific object of this invention is to provide a new and improved line drop compensating circuit having a reactive component which is continuously variable and produces a voltage which is substantially 90° out of phase with the line current of an alternating current circuit.

Other objects of the invention will, in part, be obvious and will, in part, appear hereinafter.

For a fuller understanding of the nature and objects of the invention, reference should be had to the following detailed description taken in connection with the accompanying drawing, in which.

Figure 1:
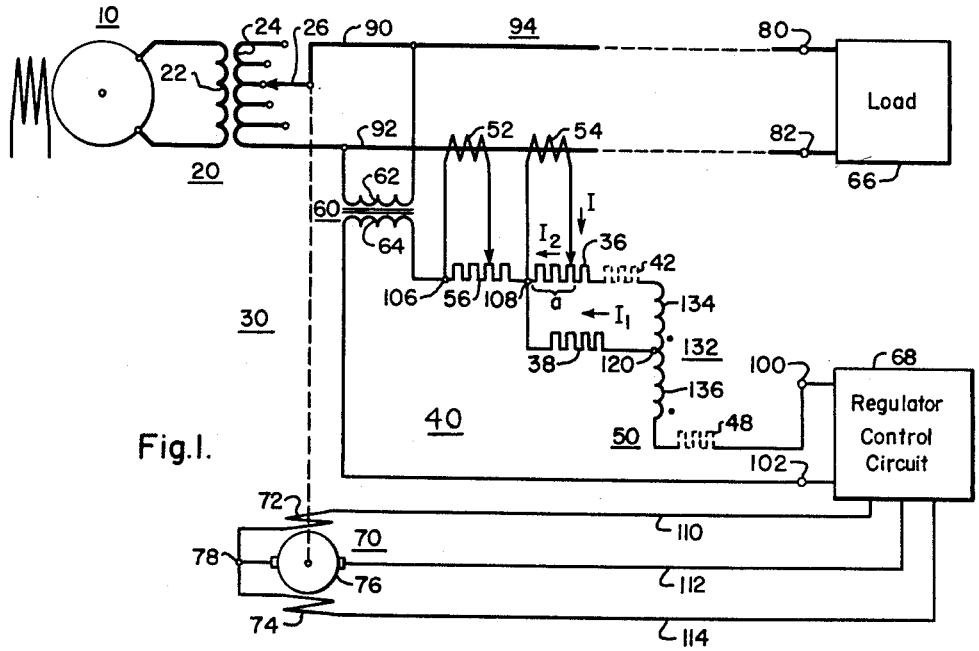
Figure 1 is a schematic diagram of one embodiment of this invention.

Referring now to the drawing and Fig. 1 in particular, the invention is shown embodied in a regulator system 30 which is connected to maintain the voltage at the terminals 80 and 82 of the load 66 at substantially a predetermined value. In general, the regulator system 30 comprises a voltage measuring device, specifically a potential transformer 60 for producing a voltage which is proportional to the voltage between the conductors 90 and 92 of the alternating current circuit 94; a line drop compensating circuit 40 for producing a compensating voltage proportional to the line drop voltage between the load 66 and the point where the potential transformer 60 is connected to the alternating current circuit 94; a regulator control circuit 68 responsive to the voltage output of the potential transformer 60 as modified by the compensating voltage across the compensating circuit 40; and a reversible motor 70 responsive to the output of the regulator control circuit 68 for controlling the voltage between the conductors 90 and 92 of the alternating current circuit 94. In this instance, the voltage at the conductors 90 and 92 is determined by the setting of the movable arm 26 which selects a tap on the secondary winding 24 of the step-type voltage regulator 20. The primary winding 22 of the step-type voltage regulator 20 is connected across the source of alternating current 10.

In particular, a voltage proportional to the line voltage of the alternating current circuit 94 is obtained by connecting the primary winding 62 of the potential transformer 60 at the conductors 90 and 92. The secondary winding 64 is connected in series circuit relationship with the line drop compensating circuit 40. The output voltage across the secondary winding 64 of the potential transformer 60 is therefore connected in series circuit relationship with the output voltage of the line drop compensating circuit 40 and the vector sum of the two voltages is applied to the input of the regulator control circuit 68 at terminals 100 and 102. One side of the secondary winding 64 is connected directly to the regulator control circuit 68 at terminal 102. The other side of the secondary winding 64 is connected at terminal 106 of the line drop compensating circuit 40.

The line drop compensating circuit 40 comprises a resistive element, specifically a potentiometer 56 and a reactive circuit 50. The current transformer 52 is connected to circulate a current proportional to the line current of the alternating current circuit 94 through a portion of the potentiometer 56. The potentiometer 56 is connected in series circuit relationship with the secondary winding 64 of the potential transformer 60 at terminal 106 and with the reactive circuit 50 at terminal 108. The resistive component of the line drop compensating voltage appears between terminals 106 and 108 and is in phase with the line current of the alternating current circuit 94. The reactive circuit 50 of the line drop compensating circuit 40 comprises a potentiometer 36, a resistor 38 and a tapped reactor 132. The current transformer 54 is connected to circulate a current proportional to the line current of the alternating current circuit 94 through both portions of the potentiometer 36, through the winding 134 of the tapped reactor 132, and through the resistor 38. The winding 136 of the tapped reactor 132 is connected between the tap terminal 120 of the reactor 132 and the input terminal 100 of the regulator control circuit 68. The reactive circuit 50 of the line drop compensating circuit 40, in general, is connected in series circuit relationship between the terminal 100 of the regulator control circuit 68 and the potentiometer 56 at terminal 108. The reactive component of the line drop compensating voltage is produced by the current circulated in the reactive circuit 50 by the current transformer 54 and the mutual inductance between the windings 134 and 136 of the tapped reactor 132 and appears between terminals 108 and 100. The inherent resistances of the windings 134 and 136 of the tapped reactor 132 are represented by the resistors 42 and 48 respectively and they are represented as being in series circuit relationship with the windings 134 and 136, respectively. The resistor 38 is connected in parallel circuit relationship with the potentiometer 36, the resistor 42 and the winding 134 between the terminal 108 and the tap terminal 120 of the tapped reactor 132.

In the operation of the line drop compensating circuit 40, the resistance of the potentiometer 56 is adjusted to be proportional to the resistance of the alternating current circuit between the load 66 and the point where the potential transformer 60 is connected to the alternating current circuit 94. Therefore, when a current proportional to the line current of the alternating current circuit 94 is circulated through the selected portion of the potentiometer 56 the resistive component of the line drop compensating voltage is proportional to the resistive or in-phase component of the line drop voltage between the load 66 and the point where the potential transformer 60 is connected to the alternating current circuit 94.

In the operation of the reactive circuit 50 of the line drop compensating circuit 40, it has been found that by properly proportioning the values of the components of the reactive circuit 50, the output voltage of the reactive circuit 50 appearing at terminals 108 and 100 is substantially 90° out of phase with the line current of the alternating current circuit 94 and continuously variable by the setting of the potentiometer 36. The output voltage of the reactive circuit 50 may be adjusted by the setting of the potentiometer 36 to be proportional to the reactive component of the line drop voltage between the load 66 and the point where the potential transformer 60 is connected to the alternating current circuit 94.

The derivation of the value of the reactive component of the line drop compensating voltage which appears between terminals 108 and 100 is as follows: It is assumed that the current drawn by the regulator control circuit 68 is negligible. This assumption is justifiable because the current drawn by a properly designed voltage responsive device is always very small in order that the voltage drop caused by this current will not introduce an error in the response of the device. The following terminology is employed:

$I$ = The output current of the current transformer 54.
$I_1$ = The current circulated through an adjustable portion $(1-a)$ of the resistance R of the element 36, through the winding 134 of the tapped reactor 132 and through the resistance $R_1$ of the element 38.
$I_2$ = The current circulated through an adjustable portion "$a$" of the resistance R of element 36.
$X$ = The reactance of the winding 134 of the tapped reactor 132.
$M$ = The mutual reactance due to the mutual inductance between the windings 134 and 136 of the tapped reactor 132.
$R$ = The resistance of the element 36.
$R_1$ = The resistance of the element 38.
$R_x$ = The inherent resistance of the winding 134.
$E_c$ = The reactive compensating voltage between the terminals 108 and 100.
$E_2$ = The voltage across the winding 136 due to the current $I_1$ in the winding 134 of the tapped reactor 132.

By inspection it is obvious that I equals the sum of $I_1$ and $I_2$. Therefore, (1) $$I_2 = I - I_1$$

By inspection the voltage $E_2$ across the winding 136 due to the current $I_1$ in the winding 134 will be (2) $$E_2 = jI_1M$$

By inspection it follows from the illustrated diagram that (3) $$E_c = jI_1M - I_1R_1 = jI_1M - I_2aR + I_1(1-a)R + I_1R_x + jI_1X$$

Collecting the terms in $I_1$ and solving for $I_1$, we obtain:

(4) $$I_1 = \frac{aI_2R}{R_1 + (1-a)R + R_x + jX}$$

By substituting the value of $I_2$ obtained from Equation 1 in Equation 4, $I_1$ in terms of I is (5) $$I_1 = \frac{aIR}{(R + R_1 + R_x) + jX}$$

By substituting the value of $I_1$ obtained from Equation 5 in Equation 3, $E_c$ in terms of I will be (6) $$E_c = \frac{jaMIR - aIRR_1}{(R + R_1 + R_x) + jX}$$

Rationalizing Equation 6, we obtain (7) $$E_c = -aIR\frac{R_1(R+R_1+R_x) - XM - jM(R+R_1+R_x) - jXR_1}{(R+R_1+R_x)^2 + X^2}$$

In order to eliminate the real term of Equation 7, it is obvious that $R_1$ must be selected so that (8) $$R_1(R + R_1 + R_x) - XM = 0$$

Rearranging Equation 8, we obtain (9) $$R_1 = \frac{XM}{R + R_1 + R_x}$$

Substituting the value of $R_1$ obtained in Equation 9 in Equation 7, we obtain

(10) $$E_c = jaIM\frac{R}{R + R_1 + R_x}$$

As indicated in Equation 10 above, the reactive compensating voltage $E_c$ between the terminals 108 and 100 of the reactive circuit 50 will be proportional to the line current of the alternating current circuit 94 since the voltage $E_c$ is proportional to the current I from the current transformer 54. The reactive compensating voltage will also be continuously variable by the setting of the potentiometer 36 since the reactive compensating voltage is proportional to "$a$" which is the portion of the resistance of the potentiometer 36 between the terminal 108 and the arm of the potentiometer 36. It will be noted that if the value of the components of the reactive circuit 50 are proportioned in accordance with Equation 9 above, then the reactive compensating voltage $E_c$ as indicated by Equation 10 will not include any real term but only a component which is 90° out of phase with the line current of the alternating current circuit 94.

Figure 3:
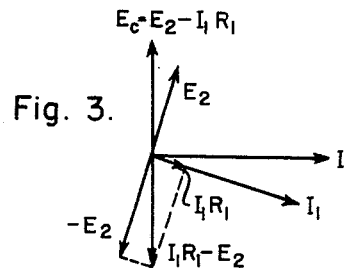
Fig. 3 is a vector diagram illustrating the phase relationship of the voltages and currents in the reactive circuit shown in Fig. 1.

Referring to Fig. 3, the phase relationship of some of the voltages and currents in the reactive circuit 50 is illustrated. As indicated in Equations 2 and 3 above the reactive compensating voltage $E_c$ is equal to the vector sum of the voltage $E_2$ across the winding 136 due to the current $I_1$ in the winding 134 of the tapped reactor 132 and the voltage drop $I_1R_1$ across the resistance $R_1$ of the element 38. It is seen from the vector diagram that the vector addition of the voltage $I_1R_1$ and the voltage $E_2$ results in the reactive compensating voltage $E_c$ being substantially 90° out of phase with the current I from the current transformer 54. It will be readily appreciated that reversed reactive compensation can be obtained from the reactive circuit 50 by adding a reversing switch (not shown) between the output of the current transformer 54 and the potentiometer 36. This reversed reactive compensation is illustrated by the lower half of the vector diagram illustrated in Fig. 3.

Figure 2:
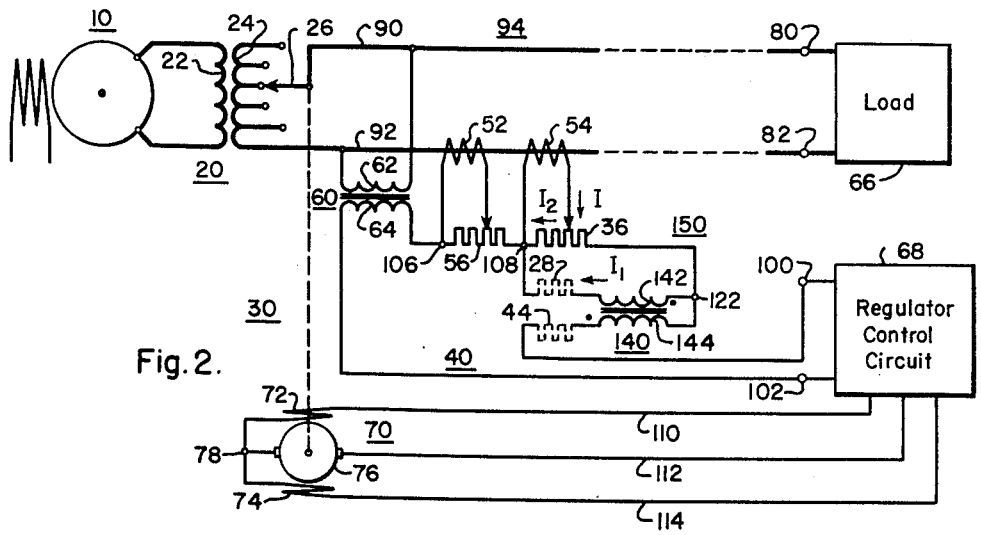
Fig. 2 is a schematic diagram of another embodiment of this invention.

Referring to Fig. 2 of the drawing, a second embodiment of this invention is illustrated with a different reactive circuit 150. The second reactive circuit 150 is similar to the reactive circuit 50 of Fig. 1. The reactive circuit 150 of Fig. 2 differs from the reactive circuit 50 of Fig. 1 in that the inherent resistance 28 of the winding 142 of the tapped reactor 140 performs a similar function to the resistor 38 of the reactive circuit 50 of Fig. 1. The general arrangement of the reactive circuit 150 is similar to the arrangement of the reactive circuit 50 with the current transformer 54 and the potentiometer 36 connected in the same manner in both the reactive circuits 50 and 150. In the reactive circuit 150, however, the winding 142 of the reactor 144 is connected in parallel circuit relationship with the potentiometer 36 between the terminals 108 and 122. The winding 144 is connected in series circuit relationship between the terminals 122 and 100. The resistance 44 represents the inherent resistance of the winding 144 of the reactor 140. In the reactive circuit 150 the currents I and $I_2$ flow in the same manner as in the reactive circuit 50. The current $I_1$, however, flows from the arm of the potentiometer 36 to the terminal 122 through the winding 142 of the reactor 140 and back to the terminal 108. The reactive compensating voltage developed between the terminals 108 and 100 is continuously variable by the setting of the potentiometer 36 when the values of the components of the reactive circuit 150 are properly proportioned. The reactive compensating voltage between the terminals 108 and 100 of the reactive circuit 150 will then be proportional also to the current I which, in turn, is proportional to the line current of the alternating current circuit 94. In the operation of the reactive circuit 150, the setting of the potentiometer 36 is adjusted so that the reactance of the reactive circuit 150 is proportional to the reactance of the alternating current circuit between the load 66 and the point where the potential transformer 60 is connected to the alternating current circuit 94.

The derivation of the value of the reactive compensating voltage between terminals 100 and 108 of the reactive circuit 150 is as follows:

The assumptions of the previous derivation will still apply. The following terminology is employed:

$I$=The output current of the current transformer 54.
$I_1$=The current circulated through an adjustable portion $(1-a)$ of the resistance R of the element 36, and through the winding 142 of the reactor 140.
$I_2$=The current circulated through an adjustable portion "$a$" of the resistance R of the element 36.
$X$=The reactance of the winding 142 of the reactor 140.
$M$=The mutual reactance due to the mutual inductance between the windings 142 and 144 of the reactor 140.
$R$=Resistance of the potentiometer 36.
$R_x$=The inherent resistance of the winding 142 of the reactor 140 and
$E_c$=The reactive compensating voltage between the terminals 108 and 100 of the reactive circuit 150.

By inspection it is obvious that I equals the sum of $I_1$ and $I_2$. Therefore (1) $$I_2 = I - I_1$$

By inspection, it follows from the illustrated diagram in Fig. 2 that (2) $$E_c = jI_m M - I_1(R_x + jX) = jI_1 M + I_1(1-a)R - aI_2 R$$

Collecting the terms in $I_1$ and solving $I_1$ we obtain (3) $$I_1 = \frac{aI_2 R}{R_x + (1-a)R + jX}$$

By substituting the value of $I_2$ obtained from Equation 1 in Equation 3, $I_1$ in terms of I is (4) $$I_1 = \frac{aIR}{R + R_x + jX}$$

By substituting the value of $I_1$ obtained from Equation 4 in Equation 2, $E_c$ in terms of I will be (5) $$E_c = \frac{jaMIR - aIR(R_x + jX)}{(R+R_x)+jX}$$

Rationalizing Equation 5, we obtain (6) $$E_c = -aIR \frac{R_x(R+R_x) - X(M-X) - jR_x X - j(M-X)(R+R_x)}{(R+R_x)^2 + X^2}$$

In order to eliminate the real term of Equation 6, it is obvious that the circuit elements must be selected so that:

(7) $$R_x(R+R_x) - X(M-X) = 0$$

Rearranging Equation 7 we obtain (8) $$R_x = \frac{X(M-X)}{R+R_x}$$

Substituting the value of $R_x$ obtained in Equation 8 in Equation 6 we obtain (9) $$E_c = \frac{jaIR(M-X)}{R+R_x}$$

The reactive compensating voltage $E_c$ will be proportional to the reactance X of the winding 142 if the following condition is satisfied

(10) $$X = \frac{R(M-X)}{R+R_x}$$

Rearranging Equation 10 we obtain

(11) $$M - X = \frac{X(R+R_x)}{R}$$

Substituting the value for $M-X$ obtained in Equation 11 in Equation 9 and solving for $E_c$ we obtain

(12) $$E_c = jaIX$$

As indicated in Equation 12 above, the reactive compensating voltage between the terminals 108 and 100 of the reactive circuit 150 is continuously variable and proportional to the resistance of the potentiometer between the terminal 108 and the arm of the potentiometer 36 of the reactive circuit 150. It is also directly proportional to the current I which, in turn, is proportional to the line current of the alternating current circuit 94. Assuming that the values of the components of reactive circuit 150 are in accordance with the condition stated in Equation 8 above, the reactive compensating voltage will be substantially 90° out of phase with the line current of the alternating current circuit 94 and the impedance of the reactive circuit 150 will not include any real term.

Referring to Fig. 1 of the drawing, the regulator control circuit 68 in general is responsive to the vector sum of the output voltage from the potential transformer 60 between the terminals 106 and 102 and the output voltage of the line drop compensating circuit 40 between the terminals 100 and 106. The vector sum of the two voltages is applied at the input terminals 100 and 102 of the regulator control circuit 68 which may be of any conventional type. In this instance, the regulator control circuit 68 is shown connected to the reversible motor 70 by the three conductors 110, 112 and 114. The voltage applied at the input terminals 100 and 102 of the regulator control circuit 68 is proportional to the voltage at the terminals 80 and 82 of the load 66. Whenever the voltage at the input terminals 100 and 102 of the regulator control circuit 68 is above or below a predetermined value, the regulator control circuit is disposed to energize one of the fields 72 or 74 of the reversible motor 70 through the conductors 110, 112 and 114. Whether the voltage at the input terminals 100 and 102 of the regulator control circuit 68 is above or below a predetermined value determines which field 72 or 74 of the reversible motor 70 is energized.

The reversible motor 70 is a conventional type, having an armature 76 and two fields 70 and 72, each field being connected at a common terminal 78. The other side of the field 72 is connected to the conductor 110 from the regulator control circuit 68. The other side of the field 74 is connected to the conductor 114 from the regulator control circuit 68. One side of the armature is connected at terminal 78 and the other side of the armature is connected to the conductor 112 from the regulator control circuit 68. The reversible motor 70 is mechanically coupled to the movable arm 26 which selects the proper tap on the secondary winding 24 of the step-type voltage regulator 20 to control the voltage between the conductors 90 and 92 of the alternating current circuit 94.

The operation of the complete regulator system 30 will now be described. As stated previously, the function of the regulator system 30 is to maintain the voltage at the terminals 80 and 82 of the load 66 at substantially a predetermined value. The potential transformer 60 provides a voltage across its secondary winding 64 which is proportional to the voltage between the conductors 90 and 92 of the alternating current 94. The line drop compensating circuit 40 provides a voltage output in series circuit relationship with the output voltage of the secondary winding 64 of the potential transformer 60 which when added vectorially to the output voltage of the potential transformer 60 results in a voltage at the terminals 100 and 102 of the regulator control circuit 68 which is proportional to the voltage between the terminals 80 and 82 of the load 66. When the voltage at the terminals 80 and 82 of the load 66 is at its regulated value the voltage at terminals 100 and 102 which is proportional to the voltage at 80 and 82 will be such that there will be no output from the regulator control circuit 68 and the reversible motor 70 will be deenergized. When, however, the voltage at the terminals 80 and 82 of the load 66 and the proportional voltage at terminals 100 and 102 is above or below a predetermined value, the output of the regulator control circuit 68 will energize either the field 72 or the field 74 of the reversible motor 70. When a field of the reversible motor 70 is energized by the regulator control circuit 68, the reversible arm 26 will select the proper tap on the secondary winding 24 of the step-type voltage regulator 20 to restore the voltage at the terminals 80 and 82 of the load 66 to the regulated value. In general, the operation of the regulator system 30 illustrated in Fig. 2 will be the same as the operation of the regulator system 30 illustrated in Fig. 1.

It is to be understood that the invention may be used in combination with other types of voltage regulators such as induction voltage regulators and with other types of voltage responsive devices such as voltage sensitive relays, instruments and meters.

The apparatus embodying the teachings of this invention has several advantages. For instance, a line drop compensating circuit embodying this invention provides a reactive compensating voltage which is continuously variable and substantially 90° out of phase with the line current of an alternating current circuit. The phase angle error introduced by the reactive compensating voltage is substantially eliminated by a relatively simple circuit arrangement.

Since numerous changes may be made in the above-described apparatus and circuits and different embodiments of this invention may be made without departing from the spirit thereof, it is intended that all matter contained in the foregoing descripion and in the accompanying drawing shall be interpreted as illustrative and not in a limiting sense.

I claim as my invention:

1. In a line drop compensating circuit for a device responsive to the line voltage of an alternating current circuit carrying a current, the combination comprising first means for obtaining a voltage proportional to the voltage of said alternating current circuit, a variable resistance proportional to the resistance of a particular section of said alternating current circuit, a reactive circuit having a continuously variable reactance proportional to the reactance of said section of said alternating current circuit, said variable resistance and said reactive circuit being connected in series circuit relationship with each other and with said first means, said reactive circuit including resistive and inductive reactance means, second means for circulating a current through said variable resistance and said reactive circuit proportional to the current of said alternating current circuit, the voltage drop across said reactive circuit being substantially 90° out of phase with the current of said alternating current circuit, third means for modifying a voltage produced by said first means by the value of the total voltage across said variable resistance and said reactive circuit, and fourth means for applying said modified voltage to said voltage responsive device.

2. In a line drop compensating circuit for a device responsive to the line voltage of an alternating current circuit carrying a line current, the combination comprising first means for obtaining a voltage proportional to the line voltage of said alternating current circuit, a first variable resistance proportional to the resistance of a section of said alternating current circuit, a reactive circuit comprising a second continuously variable resistance, a tapped reactor including a winding connected in series with said second variable resistance and a fixed resistance connected in parallel circuit relationship with the series circuit which includes said winding and said second variable resistance, the relative values of the components of said reactive circuit being proportioned to make the continuously variable reactance of said reactive circuit proportional to the reactance of said section of said alternating current circuit and to substantially eliminate the real component of the impedance of said reactive circuit, said first variable resistance and said reactive circuit being connected in series circuit relationship with each other and with said first means, second means for circulating a current through said first variable resistance and said reactive circuit proportional to the line current of said alternating current circuit, third means for modifying a voltage produced by said first means by the value of the total voltage across said first variable resistance and said reactive circuit, and fourth means for applying said modified voltage to said voltage responsive device, the voltage drop across said reactive circuit being substantially 90° out of phase with said line current and varying with said line current and with the setting of said second variable resistance.

3. In a line drop compensating circuit for a device responsive to the line voltage of an alternating current circuit carrying a line current, the combination comprising a potential transformer for obtaining a voltage proportional to the line voltage of said alternating current circuit, a first variable resistance proportional to the resistance of a particular section of said alternating current circuit, a reactive circuit comprising a second continuously variable resistance, a tapped reactor including a winding connected in series with said second variable resistance and a fixed resistance connected in parallel circuit relationship with the series circuit which includes said winding and said second variable resistance, the relative values of the components of said reactive circuit being proportioned to make the continuously variable reactance of said reactive circuit proportional to the reactance of said section of said alternating current circuit and to substantially eliminate the real component of the impedance of said reactive circuit, said first variable resistance and said reactive circuit being connected in series circuit relationship with each other and with said potential transformer, second means for circulating a current through said first variable resistance and said reactive circuit proportional to the line current of said alternating current circuit, third means for modifying the output voltage produced by said potential transformer by the value of the total voltage across said first variable resistance and said reactive circuit, and fourth means for applying said modified voltage to said voltage responsive device, the voltage drop across said reactive circuit being substantially 90° out of phase with said line current and varying with said line current and with the setting of said second variable resistance.

4. In a line drop compensating circuit for a device responsive to the line voltage of an alternating current circuit carrying a line current, the combination comprising first means for obtaining a voltage proportional to the line voltage of said alternating current circuit, a first variable resistance proportional to the resistance of a particular section of said alternating current circuit, a reactive circuit comprising a second continuously variable resistance, a tapped reactor including a winding connected in series with said second variable resistance and a fixed resistance connected in parallel with the series circuit which includes said reactor and said second variable resistance, the relative values of the components of said reactive circuit connected in circuit relationship being proportioned to make the continuously variable reactance of said reactive circuit proportional to the reactance of said section of said alternating current circuit and to subtsantially eliminate the real component of the impedance of said reactive circuit, said first variable resistance and said reactive circuit being connected in series circuit relationship with each other and with said first means, a current transformer for circulating a current through said first variable resistance and said reactive circuit proportional to the line current of said alternating current circuit, third means for modifying the output voltage produced by said first means by the value of the total voltage across said first variable resistance and said reactive circuit, and fourth means for applying said modified voltage to said voltage responsive device, the voltage drop across said reactive circuit being substantially 90° out of phase with said line current and varying with said line current and with the setting of said second variable resistance.

5. In a line drop compensating circuit for a device responsive to the line voltage of an alternating current circuit carrying a line current, the combination comprising first means for obtaining a voltage proportional to the line voltage of said alternating current circuit, a first variable resistance proportional to the resistance of a particular section of said alternating current circuit, a reactive circuit comprising a second continuously variable resistance and a tapped reactor having a first winding connected in parallel circuit relationship with said second variable resistance and a second winding connected in series with said second variable resistance, the relative values of the components of said reactive circuit being proportioned to make the continuously variable reactance of said reactive circuit proportional to the reactance of said particular section of said alternating current circuit and to substantially eliminate the real component of the impedance of said reactive circuit, said variable resistance and said reactive circuit being connected in series circuit relationship with each other and with said first means, second means for circulating a current through said first variable resistance and said reactive circuit proportional to the line current of said alternating current circuit, third means for modifying the output voltage produced by said first means by the value of total voltage across said first variable resistance and said reactive circuit, and fourth means for applying said modified voltage to said voltage responsive device, the voltage drop across said reactive circuit being substantially 90° out of phase with said line current and varying with said line current and with the setting of said second variable resistance.

6. In a line drop compensating circuit for a device responsive to the line voltage of an alternating current circuit carrying a line current, the combination comprising first means for obtaining a voltage proportional to the line voltage of said alternating current circuit, a first variable resistance proportional to the resistance of a particular section of said alternating current circuit, a reactive circuit comprising a second continuously variable resistance and a taped reactor having a first winding connected in parallel circuit relationship with said second variable resistance and a second winding connected in series with said second variable resistance, the relative values of the components of said reactive circuit being proportioned to make the continuously variable reactance of said reactive circuit proportional to the reactance of said section of said alternating current circuit and to substantially eliminate the real component of the impedance of said reactive circuit, said first variable resistance and said reactive circuit being connected in series circuit relationship with each other and with said first means, a current transformer for circulating a current through said first variable resistance and said reactive circuit proportional to the line current of said alternating current circuit, third means for modifying the voltage produced by said first means by the value of the total voltage across said first variable resistance and said reactive circuit, and fourth means for applying said modified voltage to said voltage responsive device, the voltage drop across said reactive circuit being substantially 90° out of phase with said line current and varying with said line current and with the setting of said second variable resistance.

7. In a voltage regulating system for an alternating current power circuit having a line voltage and a line current, the combination comprising first means for obtaining a voltage proportional to said line voltage, a line drop compensating circuit connected in series circuit relationship with said first means, said line drop compensating circuit comprising a variable resistance and a continuously variable reactive circuit, said variable resistance and said reactive circuit having resistance and reactance values proportional to the resistance and reactance respectively of a particular section of said alternating current power circuit, said reactive circuit including resistive and inductive reactance means, second means for circulating a current proportional to said line current through said line drop compensating circuit, the voltage drop across said reactive circuit being substantially 90° out of phase with said line current, and third means for controlling said line voltage of said alternating current circuit in accordance with the net voltage output of said first means as modified by the voltage output of said line drop compensating circuit.

8. In a voltage regulating system for an alternating current power circuit having a line voltage and a line current, the combination comprising first means for obtaining a voltage proportional to said line voltage, a line drop compensating circuit connected in series circuit relationship with said first means, said compensating circuit comprising a first variable resistance and a continuously variable reactive circuit, said first variable resistance and said reactive circuit having resistance and reactance values proportional to the resistance and reactance respectively of a particular section of said alternating current power circuit, said reactive circuit comprising a second continuously variable resistance, a tapped reactor having a winding connected in series with said second variable resistance and a fixed resistance connected in parallel circuit relationship with the series circuit which includes said winding and said variable resistance, the relative values of the components of said reactive circuit being proportioned to substantially eliminate the real component of the impedance of said reactive circuit, second means for circulating a current proportional to said line current through said line drop compensating circuit, and third means for controlling said line voltage of said alternating current circuit in accordance with the net voltage output of said first means as modified by the voltage output of said line drop compensating circuit, the voltage drop across said reactive circuit being substantially 90° out of phase with said line current and varying with said line current and with the setting of said second variable resistance.

9. In a voltage regulating system for an alternating current power circuit having a line voltage and a line current, the combination comprising first means for obtaining a voltage proportional to said line voltage, a line drop compensating circuit connected in series circuit relationship with said first means, said compensating circuit comprising a first variable resistance and a continuously variable reactive circuit, said first variable resistance and said reactive circuit having resistance and reactance values proportional to the resistance and reactance respectively of a particular section of said alternating current power circuit, said reactive circuit comprising a second continuously variable resistance, and a tapped reactor having a winding connected in series with said second variable resistance and a fixed resistance connected in parallel circuit relationship with the series circuit which includes said winding and said second variable resistance, the relative values of the components of said reactive circuit being proportioned to substantially eliminate the real component of the impedance of said reactive circuit, a current transformer for circulating a current proportional to said line current through said line drop compensating circuit, and third means for controlling said line voltage of said alternating current circuit in accordance with the net voltage output of said first means as modified by the voltage output of said line drop compensating circuit, the voltage drop across said reactive circuit being substantially 90° out of phase with said line current and varying with said line current and with the setting of said second variable resistance.

10. In a voltage regulating system for an alternating current power circuit having a line voltage and a line current, the combination comprising first means for obtaining a voltage proportional to said line voltage, a line drop compensating circuit connected in series circuit relationship with said first means, said compensating circuit comprising a first variable resistance and a continuously variable reactive circuit, said first variable resistance and said reactive circuit having resistance and reactance values proportional to the resistance and reactance respectively of a particular section of said alternating current power circuit, said reactive circuit comprising a second continuously variable resistance and a tapped reactor having a first winding connected in parallel with said second variable resistance and a second winding connected in series circuit relationship with said second variable resistance, the relative values of the components of said reactive circuit being proportioned to substantially eliminate the real component of the impedance of said reactive circuit, second means for circulating a current proportional to said line current through said line drop compensating circuit, and third means for controlling said line voltage of said alternating current circuit in accordance with the net voltage output of said first means as modified by the voltage output of said line drop compensating circuit, the voltage drop across said reactive circuit being substantially 90° out of phase with said line current and varying with said line current and with the setting of said second variable resistance.

11. In a voltage regulating system for an alternating current power circuit having a line voltage and a line current, the combination comprising first means for obtaining a voltage proportional to said line voltage, a line drop compensating circuit connected in series circuit relationship with said first means, said line drop compensating circuit comprising a first variable resistance and a continuously variable reactive circuit, said first variable resistance and said reactive circuit having resistance and reactance values proportional to the resistance and reactance respectively of a particular section of said alternating current power circuit, said reactive circuit comprising a second continuously variable resistance and a tapped reactor having a first winding connected in parallel and a second winding connected in series circuit relationship with said second variable resistance, the relative values of the components of said reactive circuit being proportioned to substantially eliminate the real component of the impedance of said reactive circuit, a current transformer for circulating a current proportional to said line current through said line drop compensating circuit, and third means for controlling said line voltage of said alternating current circuit in accordance with the net voltage output of said first means as modified by the voltage output of said line drop compensating circuit, the voltage drop across said reactive circuit being substantially 90° out of phase with said line current and varying with said line current and with the setting of said second variable resistance.

12. In a voltage regulating system for an alternating current power circuit having a line voltage and a line current, the combination comprising a potential transformer for obtaining a voltage proportional to said line voltage, a line drop compensating circuit connected in series circuit relationship with the output of said potential transformer, said compensating circuit comprising a first variable resistance and a continuously variable reactive circuit, said first variable resistance and said reactive circuit having resistance and reactance values proportional to the resistance and reactance respectively of a particular section of said alternating current power circuit, said reactive circuit comprising a second continuously variable resistance and a tapped reactor having a first winding connected in parallel and a second winding connected in series circuit relationship with said second variable resistance, the relative values of said components of said reactive circuit being proportioned to substantially eliminate the real component of the impedance of the said reactive circuit, second means for circulating a current proportional to said line current through said line drop compensating circuit, and third means for controlling said line voltage of said alternating current circuit in accordance with the voltage output of said potential transformer as modified by the voltage output of said line drop compensating circuit, the voltage drop across said reactive circuit being substantially 90° out of phase with said line current and varying with said line current and with the setting of said second variable resistance.

13. In a compensating circuit for obtaining a voltage substantially 90° out of phase with the line current of an alternating current circuit and which varies with said line current, the combination comprising, a current transformer connected in circuit relation with said alternating current circuit for obtaining a current I proportional to said line current, a potentiometer having a total resistance R and an arm whose setting divides said potentiometer into two adjustable portions, said current transformer being connected between one end and the arm of said potentiometer, a tapped reactor including a first winding having a reactance X and an inherent resistance $R_x$ and a second winding, the mutual reactance between said first and second windings of said reactor having a value M, said reactor being connected in series with said potentiometer with said first winding connected to the other end of said potentiometer, and a fixed resistor having a resistance $R_1$ connected in parallel with said potentiometer and said first winding of said reactor, the component values of said potentiometer, said tapped reactor and said fixed resistor being proportioned as follows:

$$R_1 = \frac{XM}{R + R_1 + R_x}$$

whereby the total voltage across said potentiometer and said reactor is substantially 90° out of phase with the current I and whose magnitude varies with the setting of the arm of said potentiometer.

14. In a compensating circuit for obtaining a voltage which is substantially 90° out of phase with the line current of an alternating current circuit and which varies with said line current, the combination comprising, a current transformer connected in circuit relation with said alternating current circuit for providing a current I which is proportional to said line current, a potentiometer having a total resistance R and an arm whose setting divides said potentiometer into two adjustable portions, said current transformer being connected between one end and the arm of said potentiometer, a reactor including a first winding having a reactance X and an inherent resistance $R_x$ and a second winding, the mutual reactance between said first winding and said second winding of said reactor having a value M, said first winding being connected in parallel with said potentiometer and said second winding being connected in series with said potentiometer, the component values of said potentiometer and said reactor being proportioned as follows:

$$R_x = \frac{X(M-X)}{R}$$

whereby the total voltage across said potentiometer and said reactor will be substantially 90° out of phase with said line current and vary with the setting of the arm of said potentiometer.

15. In a compensating circuit for obtaining a voltage which is substantially 90° out of phase with and varies with the line current of an alternating current circuit, first means connected in circuit relation with said alternating current circuit for obtaining a measure of said line current, a potentiometer having an arm for varying the setting thereof, said first means being connected between one end and the arm of said potentiometer, and a tapped reactor having a first winding connected in parallel with said potentiometer and a second winding connected in series with said potentiometer, the inherent resistance of said first winding being substantially equal to the ratio of the product of the reactance of said first winding times the difference between the mutual reactance of said first and second windings and the reactance of said first winding to the sum of the resistance of said potentiometer and said inherent resistance of said first winding, the voltage drop across said potentiometer and said reactor varying with said measure of the line current and with the setting of said potentiometer and being substantially 90° out of phase with said line current.

16. In a compensating circuit for obtaining a voltage which varies with and is substantially 90° out of phase with the line current of an alternating current circuit, first means connected in circuit relation with said alternating current circuit for providing a current proportional to said line current, a potentiometer having an arm for varying the setting thereof, said first means being connected between one end and the arm of said potentiometer, a tapped reactor having a first winding connected in series with said potentiometer and a second winding, and a fixed resistor connected in parallel with the series circuit which includes said potentiometer and said winding of said reactor, the resistance of said fixed resistor being equal to the ratio of the product of the reactance of said first winding and the mutual reactance between said first and second windings to the sum of the resistances of said fixed resistor and said potentiometer and the inherent resistance of said first winding.

References Cited in the file of this patent

UNITED STATES PATENTS

| | | |
|---|---|---|
| 1,740,332 | Champlin | Dec. 17, 1929 |
| 1,959,181 | Thompson | May 15, 1934 |
| 2,185,715 | Starr | Jan. 2, 1940 |
| 2,428,566 | Harder | Oct. 7, 1947 |
| 2,454,165 | Harder | Nov. 16, 1948 |